(12) United States Patent
Kariguddaiah

(10) Patent No.: US 10,496,058 B2
(45) Date of Patent: Dec. 3, 2019

(54) ENERGY MANAGEMENT SYSTEM AND METHOD IN BUILDINGS

(71) Applicant: Ajith Kariguddaiah, Bangalore (IN)

(72) Inventor: Ajith Kariguddaiah, Bangalore (IN)

(73) Assignee: Ajith Kariguddaiah, Bangalore (IN)

( * ) Notice: Subject to any disclaimer, the term of this patent is extended or adjusted under 35 U.S.C. 154(b) by 731 days.

(21) Appl. No.: 15/028,011

(22) PCT Filed: Oct. 7, 2014

(86) PCT No.: PCT/IN2014/000644
§ 371 (c)(1),
(2) Date: Apr. 7, 2016

(87) PCT Pub. No.: WO2015/052730
PCT Pub. Date: Apr. 16, 2015

(65) Prior Publication Data
US 2016/0282825 A1  Sep. 29, 2016

(30) Foreign Application Priority Data

Oct. 8, 2013  (IN) .......................... 3559/CHE/2013

(51) Int. Cl.
*G06Q 20/14* (2012.01)
*G05B 15/02* (2006.01)
(Continued)

(52) U.S. Cl.
CPC .............. *G05B 15/02* (2013.01); *G05B 19/42* (2013.01); *H01H 47/00* (2013.01); *H02J 3/00* (2013.01); *G05B 2219/2642* (2013.01)

(58) Field of Classification Search
CPC .......... H02J 3/00; H01H 47/00; G05B 19/42; G05B 2219/2642
See application file for complete search history.

(56) References Cited

U.S. PATENT DOCUMENTS

| | | | |
|---|---|---|---|
| 2012/0025717 A1* | 2/2012 | Klusmann | H05B 37/0218 315/152 |
| 2014/0012423 A1* | 1/2014 | Li | F24F 11/30 700/276 |
| 2014/0266669 A1* | 9/2014 | Fadell | G05B 19/042 340/501 |

OTHER PUBLICATIONS

Honeywell DG115EZIAQ TrueIAQ Digital IAQ Control. Product Catalogue. [online]. Amazon. Dec. 14, 2012 [retrieved on Jan. 2, 2019]. Retrieved from internet: <URL: https://www.amazon.com/Honeywell-DG115EZIAQ-TrueIAQ-Digital-Control/dp/B0017OCEBQ>, pp. 1-2 (Year: 2012).*

* cited by examiner

*Primary Examiner* — Robert E Fennema
*Assistant Examiner* — Mazia T Monty
(74) *Attorney, Agent, or Firm* — Barry Choobin; Patent 360 LLC

(57) ABSTRACT

The embodiments herein provide an energy management system and method. The system comprises several electronic equipments installed in the standalone environmental space, several sensors in communication with a controller unit and a power supply. The sensors detect the environmental conditions or parameters of the environmental space. The relays are activated to switch on/off the electronic equipments depending on the sensor inputs. The controller unit regulates the operations of the electronic equipments through the relays based on sensors inputs. The sensors are activated at a predetermined set of time periods. The controller unit activates either one or more relays based on output from one or more sensors to control operation and operating time of the electronic equipments.

17 Claims, 7 Drawing Sheets

(51) Int. Cl.
*G05B 19/42* (2006.01)
*H01H 47/00* (2006.01)
*H02J 3/00* (2006.01)

| Connected Devices | Relays No. | Motion Sensors | | | | | | Ambient Light Sensors | | | Temperature Sensors | | | Time Period Programs | | | |
|---|---|---|---|---|---|---|---|---|---|---|---|---|---|---|---|---|---|
| | | 1 | 2 | 3 | 4 | 5 | 6 | 1 | 2 | 3 | 1 | 2 | 3 | P | S | T | C |
| L1, L3 | 1 | X | X | X | | | | | | | | | | X | | | |
| L2, L4, L5 | 2 | X | X | X | | | | | | | | | | | X | | |
| L6, L7, L13, L14 | 3 | | X | X | | | | X | | | | | | | X | | |
| L10, L11 | 4 | | X | X | | | | X | | | | | | X | | | |
| L8, L9, L15, L16 | 5 | | | X | | | | X | | | | | | | X | | |
| L12 | 6 | | | X | | | | X | | | | | | X | | | |
| EX1 | 7 | | X | X | | | | | | | | | | | | | X |
| L17, L19 | 8 | | | | X | X | X | | | | | | | X | | | |
| L18, L20, L21 | 9 | | | | X | X | X | | | | | | | | X | | |
| L22, L23, L26, L27 | 10 | | | | | X | X | X | | | | | | | X | | |
| L24, L25 | 11 | | | | | X | | X | | | | | | | X | | |
| L28 | 12 | | | | | X | | X | | | | | | X | | | |
| EX2 | 13 | | | | X | X | | | | | | | | | | | X |
| | 14 | | | | | | | | | | | | | | | | |
| | 15 | | | | | | | | | | | | | | | | |
| | 16 | | | | | | | | | | | | | | | | |

FIG. 7

ENERGY MANAGEMENT SYSTEM AND METHOD IN BUILDINGS

CROSS REFERENCE TO RELATED APPLICATIONS

The application is a National Phase Application filed with respect to the PCT Application PCT/IN2014/000644 filed on Oct. 07, 2014 with the title "AN ENERGY MANAGEMENT SYSTEM AND METHOD IN BUILDINGS". The application further claims the priority of the Indian Provisional Patent Application With No. 3559/CHE/2013 filed on Oct. 08, 2013 with the title "AN ENERGY MANAGEMENT SYSTEM". The contents of the above mentioned applications are incorporated in its entirety by reference herein.

BACKGROUND

Technical Field

The embodiments herein generally relate to a power control and management system and particularly relates to a system and method for automatically switching electronic devices in standalone areas. The embodiments herein more particularly relates to a system and method for power control and management system or automatically switching electronic devices in standalone areas.

Description of the Related Art

In the present scenario, large numbers of lighting management systems are known to be available in the market. One type of lighting management system utilizes the motion detectors or sensors. In such systems, the room lights and other electrical/electronic equipments connected to the system are turned off/on and/or are dimmed according to a detected level of motion within the room. Specially, it has been observed that it is not possible to engage someone to turn on and/or turn off lights, fans, and other equipments in standalone spaces/areas like washrooms, corridors, staircases, elevators etc., in buildings such as offices, schools, colleges, hotels, stations, airport terminals and any other public spaces which are not under control of any persons or for places in which the people are quite reluctant in their attitude to turn off the equipments like lights, fans, etc., after use, thereby leading to a wastage of power/energy.

There is always a demand/need to reduce power consumption, because of increase in energy costs and negative environmental impacts of energy usage and energy generation. Many research works have been under progress around the world since last decade to manage the power consumption. There exist many systems for managing power in specific areas but such systems are found to involve complex and bulky circuits which add to overall manufacturing cost of the device. As a solution, several attempts been have made by prior art methods/systems to come up with a more effective and less complex system for power management.

One of them being a European Patent Publication No. EP2182603, which discloses an intelligent electrical energy management system. The system includes a power supply module, a control module, a memory module, an input module, a clock module for providing a real-time clock, a current detection module for detecting the current flowing in electrical equipments, and an electronic controlled switch. The memory module, the input module, the clock module, the output terminals of the current detection module and the control terminal of the electronic controlled switches are connected to the data terminals of the control module respectively. An external power supply feeds power to the electrical equipments through the electronic controlled switch and the current detection module. The power supply module is connected to the external power supply to provide power to each module. This prior art discloses a power surge protector and does not teach any management or regulation of factors affecting a given space at a given point of time.

The US Patent Publication No. US2013/0033183 discloses a system and a method for controlling lighting. The patent discloses a controller for regulating a plurality of lighting devices configured for wireless communications in a facility. The controller includes a data communication interface for communicating with at least one of the devices. The controller further includes a control module to provide a control signal to the data communications interface for communicating to a transceiver associated with the device and for turning off the device according to an algorithm. The control signal is generated and provided based on a time of day and/or a detected condition of the facility. The transceiver reports device data to the control module to control the devices to reduce a power drawn by the devices based on the algorithm. This prior art document discloses a pure lighting control coupled with a smart grid system to reduce power during peak supply conditions and to quantify the energy saved. It does not teach any management or regulation of factors affecting a given space at a given point of time.

The US Patent Publication No. US20120239603 discloses a controlling system for adjusting the environmental conditions of at least one entity having desired environmental conditions for at least two different states. The system comprises a control means for changing and/or maintaining the environmental condition of the entities to control the equipments. The control means is adapted to provide the control parameters to equipments for adjusting the environmental condition of said entity so that at least one parameter used for controlling the environmental condition of said entity depends on at least one measured environmental condition parameter of another entity being different from the entity that is controlled by said equipment.

The European Patent Publication No. EP2118716 discloses multi-level automation control architecture, methods, and systems, to provide enhanced scalability, functionality, and cost effectiveness for energy, access, and control systems. The systems include various combinations of automation controllers, remote controllers and peripheral devices that are used to provide monitoring and control functionality over the various systems in a structure, such as HVAC, water, lighting, etc. The automation controller and various peripheral devices are implemented to provide an integrated energy management system for the structure. The system allows the user to manage energy based on the day, time, the presence of people, and the availability of natural lighting and heating, as well as to prioritize and participate in demand-response program. The system can be implemented using a remote controller and expanded through the addition of automation controllers, remote controllers, and peripheral devices to enable the system to be tailored to specific user requirements. However, the system is a home automation system used to control audio, video other that the regular peripherals.

The European Patent No. EP2168407 discloses an area lighting system comprising a plurality of lighting elements that are responsive to the movement and progression of a user through the area. Each lighting element comprises at least one light, means for powering, the lighting element, processor, communication means and is associated with a motion sensor. A detection of a user is communicated to other lighting elements that provide an appropriate level of illumination depending on the distance from the user. The lighting elements are substantially self-configurable, and may be set for either a radial proximity lighting protocol or a path network lighting protocol.

The U.S. Pat. No. 8,299,719 discloses an individually selective intelligent serial lighting system. A plurality of lighting elements is arranged in a specific configuration so that unknown location and identity of each randomly distributed and registered integrated circuit switch device, which drives lighting elements, is automatically detected, recorded and addressed. A controller individually controls every single LED, or other lighting element distributed along the length of lighting string with fixed set of wires. Each lighting element is mounted on or connected to and driven from a PCB Switch, consisting of an integrated circuit switch, each programmed or lasered with a unique serial number, with at least two ports and a communication protocol. Software routines are intelligent in a sense that find position of each individual lighting element when any existing or new lighting element or cable assembly is attached to or detached from the system whether in operation and alive or upon power up.

A non patent literature available on website http://www.futurelightingsolutions.com/en/technologies/Pages/controls.aspx discloses reductions in power consumption by intelligent lighting systems that incorporate monitoring, control and communication networks. Such systems offer features ranging from dimming, motion sensing, ambient light sensing and daylight harvesting, wireless and power-line communication, to monitoring various parameters such as energy consumption; potential LED failures and LED temperature.

A non patent literature available on http://www.encelium.com/en/how-ems-works/system-architecture.html discloses an efficient commercial lighting solution which is implemented by using a standard click and go work cable and facilitated by a Ballast Module or Sensor Module installed on each device. These modules are interconnected in a daisy chain topology and networked back to an ECU, an embedded processor. The ECU collects and processes information received from the sensors and distributes commands to individual ballasts. As well, ECU's are linked to existing local area networks (LANs) to enable personal lighting control on each user's personal computer. A designated building automation PC on the network operates Encelium's Polaris 3D software for overall system configuration and monitoring. The system is connected independently of existing lighting electrical circuits with minimum installation cost and maximum flexibility.

The existing lighting and power management devices are both very expensive and over engineered or they are very basic products which are timer based and switch off the connected load after the specified interval. The existing timer based products in the market do not control individual equipment but switch on/off the entire load. Hence there is a requirement for a system and method to control individual equipments, depending on user preference.

Also it has been noticed that, with existing systems, the user experience is far from satisfactory, as the load would go off after a programmed time and this would cause difficulties for the users who are still in the zone but outside the area covered by the sensor. The prior arts also not work in areas where ventilation or any other factor needed to be constantly regulated especially during the time in which the area is unoccupied.

Hence there is a need for developing a system and method to provide a fully automated switching assistant for equipment like lights, ventilation units and air conditioning units etc., in a standalone space. Further there is a need for a system and method which eliminates a requirement of manual switching and also obliterates use of switches for operating the electronic equipments to provide a uniform and optimum user experience by providing automatic controlling of all the installed equipment thereby using electricity efficiently. Further there is a long felt need for a system for providing an effective and optimal user experience even with a low Return on investment (ROI).

The above mentioned shortcomings, disadvantages and problems are addressed herein and which will he understood by reading and studying the following specification.

Objects of the Embodiments

The primary object of the embodiments herein is to provide a method and system for managing and controlling a power supplied to electronic equipments such as lights, fans, exhaust, air conditioning, humidifiers, air cleaning equipment and the like in standalone places.

Another object of the embodiments herein is to eliminate a need for manual intervention by automating the entire functioning of a given space.

Yet another object of the embodiments herein is to eliminate a need for electrical switches that are used to manually control the connected equipments in a given space.

Yet another object of the embodiments herein is to provide a method and system for controlling a plurality of environmental conditions for a given space in-order to provide an optimal user experience.

Yet another object of the embodiments herein is to provide a method and system for reducing energy usage by humidifiers, air cleaning equipments, lighting and ventilation units.

Yet another object of the embodiments herein is to provide a cost effective and simple power management system and method for managing any scenario.

Yet another object of the embodiments herein is to provide a system and a method for controlling the switching of electronic equipments in standalone spaces based on a user preference.

Yet another object of the embodiments herein is to provide a system and a method for activating either one or more relays based on output from one or more sensors to control an operation and an operating time of the plurality of electronic equipments.

Yet another object of the embodiments herein is to provide a system and a method for activating a single relay based on output from one or more sensors.

Yet another object of the embodiments herein is to provide a system and a method for activating a plurality of relays based on output from one or more sensors.

Yet another object of the embodiments herein is to develop a system and a method provided with a set of Time Period Programs to operate the plurality of electronic equipments at periodical intervals or at a preset period of time.

Yet another object of the embodiments herein is to develop a system and a method to provide the customized Time Period Programs with respect to individual electronic equipments and types of environmental spaces.

Yet another object of the embodiments herein is to develop a system and a method to provide a handheld device for customizing default settings, sensor settings, time period settings associated to the relays and/or sensors, priority settings and necessary information.

Yet another object of the embodiments herein is to develop a system and a method to provide a Wi-Fi module, Bluetooth connectivity and GPRS module for enabling a wireless or wired control of the system via LAN, Ethernet, Internet or SMS. The large areas which are used to control HVACs systems are controlled based on Wi-Fi or IP based integration and integrate as a BMS system.

Yet another object of the embodiments herein is to develop a system and a method to customize the Time Period Programs for the individual electronic equipments and for the specific types of environmental spaces.

These and other objects and advantages of the present invention will become readily apparent from the following, detailed description taken in conjunction with the accompanying drawings.

SUMMARY

The various embodiments herein provide an energy management system and method. According to one embodiment herein, an energy management system is provided. According to one embodiment herein, the system comprises a plurality of electronic equipments installed in the standalone environmental space, a plurality of sensors in communication with a controller unit and a power supply. The plurality of electronic equipments is installed in an environmental space or habitat. The plurality of sensors is configured for sensing a plurality of environmental conditions or parameters of the environmental space. The plurality of relays is used for controlling the plurality of electronic equipments. The plurality of relays is configured for switching the electronic equipments depending on the sensor inputs. The controller unit is configured for controlling the operations of the plurality of electronic equipments through the plurality of relays based on the inputs from the plurality of sensors. The power supply unit is configured for providing power to the plurality of electronic equipments. The plurality of sensors is connected to the controller unit using a wired or wireless connection. The type of sensors installed depends on an application area, type of environmental space, the electronic equipments and the environmental conditions that need to be controlled concerning the plurality of sensors. The plurality of sensors is activated at a predetermined set of time periods. The predetermined of time periods are customized manually and/or using a default setting based on the type of the electronic equipments. The predetermined of time periods are customized by a handheld device connected to the system. The controller unit activates either one or more relays based on output from one or more sensors to control an operation and an operating time of the plurality of electronic equipments.

According to an embodiment herein, the controller unit comprises a plurality of relays in communication with the plurality of sensors, a microcontroller, a voltage regulation module and a plurality of electric connectors. The microcontroller is configured for managing the plurality of relays according to a preset configuration and the inputs from the plurality of sensors. The voltage regulation module is configured for energizing the controller unit. The plurality of connectors is configured for connecting the plurality of relays to the respective electronic equipments. The multiple electronic equipments are connected to a particular relay, and wherein one or more relays are controlled by one or more sensors so as to switch only a particular or specific electronic equipment connected to the respective relays. Further a single relay is activated based on the output from one or more sensors and alternately a plurality of relays are activated based on the output from one or more sensors.

According to an embodiment herein, the plurality of sensors triggers a plurality of signals according to the type of sensors. The plurality of signals is processed by the microcontroller to switch on/off the associated relays.

According to an embodiment herein, the microcontroller switches on a particular relay on receiving an input from the associated sensor connected to the particular relay. The power supply needed to energize the electronic equipment connected to the relay is passed from the voltage regulation module.

According to an embodiment herein, the microcontroller comprises a set of Time Period Programs configured to operate the plurality of electronic equipments at periodical intervals or at a preset period of time. The Time Period Programs establish a duration and periodicity to switch on/off the associated relay. The periodicity and the preset period of time are configured according to a Real Time Clock.

According to an embodiment herein, the plurality of relays is controlled without any input from the sensors. The controller unit is programmed to switch on/off the plurality of relays at particular time intervals and during a preset time of the day to ensure a constant environmental or functional factor necessary for the environmental space.

According to an embodiment herein, the set of time period program comprises a Master time period program, a plurality of subordinate time period programs and a customized time period program and the plurality of subordinate Time Period Programs are derived from the master time period program. The plurality of subordinate Time Period Programs is preset multiples of the Master Time Program. The customized time period program is set based on inputs from user.

According to an embodiment herein, the customized Time Period Programs are customizable for the individual electronic equipments and for the specific types of environmental spaces.

According to an embodiment herein, the microcontroller adopts the Time Period Program templates for a similar type of environmental spaces. The Time Period Program templates have the same settings for the electric equipments that are connected to the relevant relays in the similar environments.

According to an embodiment herein, the system further comprises a handheld device to provide options for customizing the default settings, sensor settings, time period settings associated to the relays and/or sensors, priority settings and necessary information. The hand-held device enables a user to change the system settings. The system is also self-configured using an interface on the handheld programmer so as to provide a complete independent programmable solution to the system.

According to an embodiment herein, the system comprises a built in program interface to customise the default settings, sensor settings, time period settings associated to the relays and/or sensors, priority settings, and necessary information.

According to an embodiment herein, the controller unit is provided with a switch to alter the time period of the Time Period Programs by a predetermined percentage. The relays are optionally connected in parallel with a master switch to enable dual control during any breakdown and/or maintenance.

According to an embodiment herein, the system further comprises a Ethernet, Wi-Fi, Bluetooth connectivity and GPRS module for providing wired or wireless control to the system via LAN, Ethernet, Interact or SMS. The plurality of the controller units are also connected using a LAN or wireless network and wherein the specific controller units control a plurality of devices based on the input from the other controller or controllers. For example, a plurality of networked controller units is managed to switch on/off HVAC and AHU systems based on the occupancy of the entire or specific areas.

According to an embodiment herein, the system further comprises a manual button to change an operating mode of the device to either high power saving mode or low power saving mode. The operating modes of the device include a normal mode of operations, a high power saving mode and a low power saving mode. The system is also configured to change the operating mode when large numbers of controller units are deployed to ensure greater efficiencies.

According to an embodiment herein, the plurality of sensors includes one or more sensors selected from a group consisting of motion sensor, proximity sensor, light sensor, ambient sensor, temperature sensor, humidity sensor, gas sensor, air quality sensor and smoke sensor.

According to an embodiment herein, the plurality of electronic equipments comprises fans, lighting, units, exhaust fans, ventilation fans, air-conditioning equipments, humidifiers, air cleaning equipments and room heaters.

According to an embodiment herein, the environmental space is selected from a group consisting of an office—area, cubicle, living area, wash room, residential area, and industrial factory.

According to an embodiment herein, the time period program is selected and executed based on a type of electronic equipment, a place of installation.

According to an embodiment herein, the different types of electronic equipments in a same environmental space are operated with same time period programs.

According to an embodiment herein, the different types of electronic equipments in a same environmental space are operated with mutually different time period programs.

According to one embodiment herein, a method is provided for managing and controlling an energy consumption of a plurality of electronic equipments using a controller. The method comprises a step of installing a plurality of sensors in an environmental space. The plurality of relays associated with the plurality of sensors is installed in the environmental space. The sensors are connected to the microcontroller which in turn controls the relays. The relays and the associated electronic equipments are connected through the plurality of electrical connectors. The microcontroller is connected to the plurality of relays. The microcontroller is stored with a plurality time period programs for controlling an operating time of the plurality of electronic equipments. The microcontroller activates the relays based on the inputs from the plurality of sensors. The stored time period programs are used to control the operating time and working of the plurality of electric equipments, by switching the respective relays connected to the equipments.

According to an embodiment herein, the primary function of the system along with energy efficient operation is to altogether eliminate the manual intervention and to adopt a total automation operation. The automation is provided with the use of complex factors that are need to control the system, irrespective of the size of the space or area that is to be managed.

According to an embodiment herein, the method further comprises the steps of selecting and initiating an execution of the time period program for the electronic equipment by the controller unit, based on an output from a sensor. The controller unit checks whether any other time period program is already selected and executed for the electronic equipment. The controller unit calculates a residual amount of time remaining in the execution of a previously selected and executed time period program for the electronic equipment, when a time period program is already selected and executed for operating the electronic equipment. Depending on the calculation, the controller unit compares the residual amount of time left during a running of a previously selected and executed time period program and a time value of the newly selected Time Period program. When the time value of the newly selected Time Period program and the calculated residual amount of time left during a running of a previously selected and executed time period program are different, a time value of a newly selected Time Period program is set for operating the electronic equipment based on the newly selected time period program. The electronic equipment is operated for the remaining time period of the previously selected and executed time period program, when the set time value of the newly selected Time Period program is greater than or equal to the residual amount of time left during a running of a previously selected and executed time period program.

According to an embodiment herein, the plurality of time period programs is assigned with a priority by the controller during installation of the system.

According to an embodiment herein, a particular relay and the associated electronic equipments are activated by one or more sensors. The associated electronic equipments are controlled according to the assigned Time Period Program, when the designated sensor is triggered.

According to an embodiment herein, the plurality of sensors triggers a plurality of signals according to the type of sensors. The plurality of signals is processed by the microcontroller to switch on/off of the associated relays.

According to an embodiment herein, the microcontroller switches on a particular relay on receiving an input from the associated sensor connected to the particular relay. The power supply needed to energize the electronic equipment connected to the relay is passed from the voltage regulation module.

According to an embodiment herein, the microcontroller comprises a set of Time Period Programs configured to operate the plurality of electronic equipments at periodical intervals or at a preset period of time. The Time Period Programs establish a duration and periodicity to switch on/off the associated relay. The periodicity and the preset period of time are configured according to a Real Time Clock.

According to an embodiment herein, the plurality of relays is controlled without any input from the sensors. The controller unit is programmed to switch on/off the plurality of relays at particular time intervals and during a preset time of the day to ensure a constant environmental or functional factor necessary for the environmental space.

According to an embodiment herein, the set of time period program comprises a Master time period program, a plurality of subordinate time period programs and a customized time period program. The plurality of subordinate Time Period Programs is derived from the master time period program. The plurality of subordinate Time Period Programs are preset multiples of the Master Time Program and the customized time period program is set based on inputs from user.

According to an embodiment herein, the customized Time Period Programs are customizable for the individual electronic equipments and for the specific types of environmental spaces.

According to an embodiment herein, the plurality of sensors includes one or more sensors selected from a group consisting of motion sensor, proximity sensor, light sensor, ambient sensor, temperature sensor, humidity sensor, gas sensor, smoke sensor and air quality sensors.

According to an embodiment herein, the plurality of electronic equipments comprises fans, lighting units, exhaust fans, ventilation firms, air-conditioning equipments, humidifiers, air cleaning equipments and room heaters.

According to an embodiment herein, the environmental space is selected from a group consisting of an office—area, cubicle, living area, wash room, residential area, and industrial factory.

According to an embodiment herein, the time period program is selected and executed based on a type of electronic equipment, a place of installation.

According to a embodiment herein, the different type of electronic equipments in a same environmental space is operated with same time period programs.

According to an embodiment herein, the different type of electronic, equipments in a same environmental space is operated with mutually different time period programs.

According to an embodiment herein, the exhaust fans and the lighting units in a rest room are operated with mutually different time period programs based on the output of motion sensors.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without depart from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings in which:

FIG. 7 illustrates a table listing the connection between the sensors, the relays and the associated electronic equipments installed at the Restroom, according to an embodiment herein.

Figure 1:
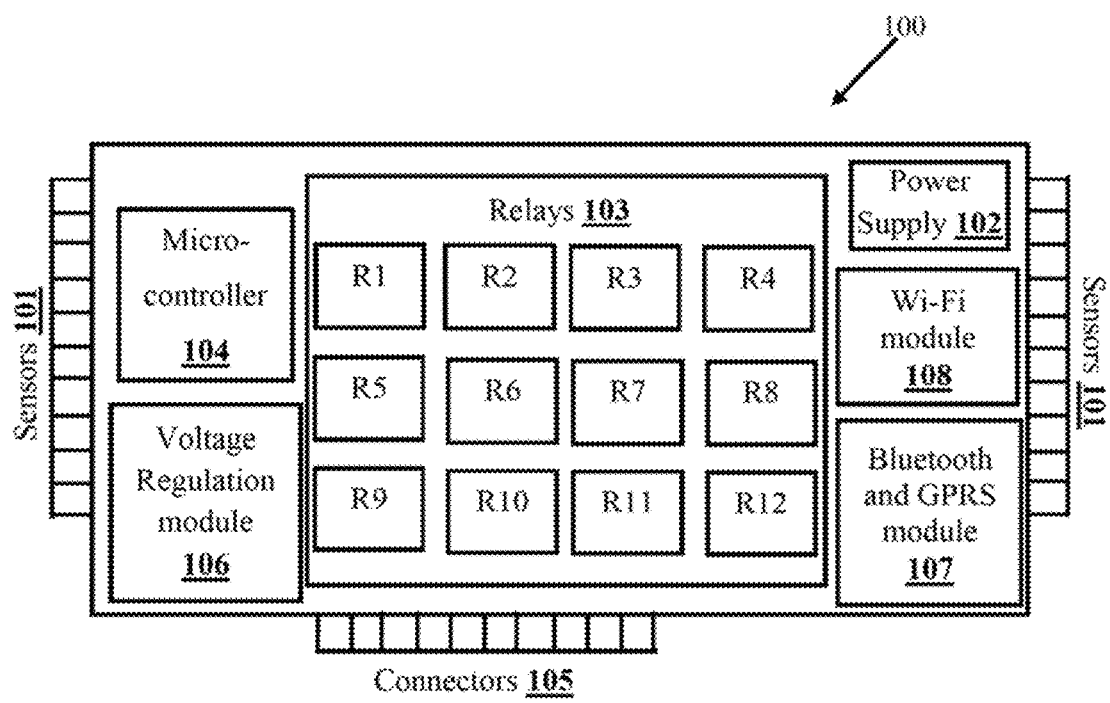
FIG. 1 illustrates a block diagram of an energy management system, according to an embodiment herein.

Although the specific features of the present invention are shown in some drawings and not in others. This is done for convenience only as each feature may be combined with any or all of the other features in accordance with the present invention.

DETAILED DESCRIPTION OF THE EMBODIMENTS HEREIN

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The various embodiments of the present invention provide an energy management system and method. The system is provided for managing and controlling the power supplied to the electronic appliances such as lights, fans, exhaust, air conditioning humidifiers, air cleaning equipments and the like, which are installed in a standalone environmental space. The system provides a user friendly and cost effective energy management method which eliminate the need for manual intervention by automating the entire functioning of the given space and hence also the necessity for electrical switches to control the connected equipment in the given space. The energy management system is adaptable at various typical standalone spaces like restrooms, conference rooms, cubicles, offices and any closed environmental spaces.

The various embodiments herein provide an energy management system and method. According to one embodiment herein, an energy management system is provided. According to one embodiment herein, the system comprises a plurality of electronic equipments installed in the standalone environmental space, a plurality of sensors in communication with a controller unit and a power supply. The plurality of electronic equipments is installed in an environmental space or habitat. The plurality of sensors is configured for sensing a plurality of environmental conditions or parameters of the environmental space. The plurality of relays is used for controlling the plurality of electronic equipments. The plurality of relays is configured for switching the electronic equipments depending on the sensor inputs. The controller unit is configured for controlling the operations of the plurality of electronic equipments through the plurality of relays based on the inputs from the plurality of sensors. The power supply unit is configured for providing power to the plurality of electronic equipments. The plurality of sensors is connected to the controller unit using a wired or wireless connection. The type of sensors installed depends on an application area, type of environmental space, the electronic equipments and the environmental conditions concerning the plurality of sensors. The plurality of sensors is activated at a predetermined set of time periods. The predetermined of time periods are customized manually and/or using a default setting based on the type of the electronic equipments. The predetermined of time periods are customized by a handheld device connected to the system. The controller unit activates either one or more relays based on output from one or more sensors to control an operation and an operating time of the plurality of electronic equipments.

According to an embodiment herein, the controller unit comprises a plurality of relays in communication with the plurality of sensors, a microcontroller, a voltage regulation module and a plurality of electric connectors. The microcontroller is configured for managing the plurality of relays according to a preset configuration and the inputs from the plurality of sensors. The voltage regulation module is configured for energizing the controller unit. The plurality of connectors is configured for connecting the plurality of relays to the respective electronic equipments. The multiple electronic equipments are connected to a particular relay, and wherein one or more relays are controlled by one or more sensors so as to switch only particular or specific electronic equipment connected to the respective relays. Further a single relay is activated based on the output from one or more sensors and alternately a plurality of relays are activated based on the output from one or more sensors.

According to an embodiment herein, the plurality of sensors triggers a plurality of signals according to the type of sensors. The plurality of signals is processed by the microcontroller to switch on/off of the associated relays.

According to an embodiment herein, the microcontroller switches on a particular relay on receiving an input from the associated sensor connected to the particular relay. The power supply needed to energize the electronic equipment connected to the relay is passed from the voltage regulation module.

According to an embodiment herein, the microcontroller comprises a set of Time Period Programs configured to operate the plurality of electronic equipments at periodical intervals or at a preset period of time. The Time Period Programs establish a duration and periodicity to switch on/off the associated relay. The periodicity and the preset period of time are configured according to a Real Time Clock or by the triggering of sensors.

According to an embodiment herein, the plurality of relays is controlled without any input from the sensors. The controller unit is programmed to switch on/off the plurality of relays at particular time intervals and during a preset time of the day to ensure a constant environmental or functional factor necessary for the environmental space.

According to an embodiment herein, the set of time period program comprises a Master time period program, a plurality of subordinate time period programs and a customized time period program and the plurality of subordinate Time Period Programs are derived from the master time period program. The plurality of subordinate Time Period Programs is preset multiples of the Master Time Program. The customized time period program is set based on inputs from user.

According to an embodiment herein, the customized Time Period Programs are customizable for the individual electronic equipments and for the specific types of environmental spaces.

According to an embodiment herein, the microcontroller adopts the Time Period Program templates for a similar type of environmental spaces. The Time Period Program templates have the same settings for the electric equipments that are connected to the relevant relays in the similar environments.

According to an embodiment herein, the system further comprises a handheld device to provide options for customizing the default settings, sensor settings, time period settings associated to the relays and/or sensors, priority settings and necessary information. The hand-held device enables a user to change the system settings.

According to an embodiment herein, the controller unit is provided with a switch to alter the time period of the Time Period Programs by a predetermined percentage. The relays are optionally connected in parallel with a master switch to enable dual control during any breakdown and/or maintenance.

According to an embodiment herein, the system further comprises a Bluetooth connectivity and GPRS module for providing wireless control to the system via LAN, Ethernet, Internet or SMS.

According to an embodiment herein, the system further comprises a manual button to change an operating mode of the device to either high power saving mode or low power saving mode. The operating modes of the device include a normal mode of operations, a high power saving mode and a low power saving mode.

According to an embodiment herein, the plurality of sensors includes one or more sensors selected from a group consisting of motion sensor, proximity sensor, light sensor, ambient sensor, temperature sensor, humidity sensor, gas sensor, smoke sensor and air quality sensors.

According to an embodiment herein, the plurality of electronic equipments comprises fans, lighting units, exhaust fans, ventilation fans, air-conditioning equipments, humidifiers, air cleaning equipments and room heaters.

According to an embodiment herein, the environmental space is selected from a group consisting of an office—area, cubicle, living area, wash room, residential, area, and industrial factory.

According to an embodiment herein, the time period program is selected and executed based on a type of electronic equipment, a place of installation.

According to an embodiment herein, the different types of electronic equipments in a same environmental space are operated with same time period programs.

According to an embodiment herein, the different types of electronic equipments in a same environmental space are operated with mutually different time period programs.

According to one embodiment herein, a method is provided for managing and controlling an energy consumption of a plurality of electronic equipments using a controller. The method comprises a step of installing a plurality of sensors in an environmental space. The plurality of relays associated with the plurality of sensors is installed in the environmental space. The sensors are connected to the respective relays and the associated electronic equipments through the plurality of electrical connectors. The microcontroller is connected to the plurality of relays The microcontroller is stored with a plurality time period programs for controlling an operating time of the plurality of electronic equipments. The microcontroller activates the relays based on the inputs from the plurality of sensors. The stored time period programs are used to control the operating time and working of the plurality of electric equipments, by switching the respective relays connected to the equipments.

According to an embodiment herein, the method further comprises the steps of selecting and initiating an execution of the time period program for the electronic equipment by the controller unit, based on an output from a sensor. The controller unit checks whether any other time period program is already selected and executed for the electronic equipment. The controller unit calculates a residual amount of time remaining in the execution of a previously selected and executed time period program for the electronic equipment, when a time period program is already selected and executed for operating the electronic equipment. Depending on the calculation, the controller unit compares the residual amount of time left during a running of a previously selected and executed time period program and a time value of the newly selected Time Period program. When the time value of the newly selected Time Period program and the calculated residual amount of time left during a running of a previously selected and executed time period program are different, a time value of a newly selected Time Period program is set for operating, the electronic equipment based on the newly selected time period program. The electronic equipment is operated for the remaining time period of the previously selected and executed time period program, when the set time value of the newly selected Time Period program is greater than or equal to the residual amount of time left during a running of a previously selected and executed time period program.

According to an embodiment herein, the plurality of time period programs is assigned with a priority by the controller during installation of the system.

According to an embodiment herein, a particular relay and the associated electronic equipments are activated by one or more sensors. The associated electronic equipments are controlled according to the assigned Time Period Program, when the designated sensor is triggered.

According to an embodiment herein, the plurality of sensors triggers a plurality of signals according to the type of sensors. The plurality of signals is processed by the microcontroller to switch on/off of the associated relays.

According to an embodiment herein, the microcontroller switches on a particular relay on receiving an input from the associated sensor connected to the particular relay. The power supply needed to energize the electronic equipment connected to the relay is passed from the voltage regulation module.

According to an embodiment herein, the microcontroller comprises a set of Time Period Programs configured to operate the plurality of electronic equipments at periodical intervals or at a preset period of time. The Time Period Programs establish a duration and periodicity to switch on/off the associated relay. The periodicity and the preset period of time are configured according to a Real Time Clock.

According to an embodiment herein, the plurality of relays is controlled without any input from the sensors. The controller unit is programmed to switch on/off the plurality of relays at particular time intervals and during a preset time of the day to ensure a constant environmental or functional factor necessary for the environmental space.

According to an embodiment herein, the set of time period program comprises a Master time period program, a plurality of subordinate time period programs and a customized time period program. The plurality of subordinate Time Period Programs is derived from the master time period program. The plurality of subordinate Time Period Programs are preset multiples of the Master Time Program and the customized time period program is set based on inputs from user.

According to an embodiment herein, the customized Time Period Programs are customizable for the individual electronic equipments and for the specific types of environmental spaces.

According to an embodiment herein, the plurality of sensors includes one or more sensors selected from a group consisting of motion sensor, proximity sensor, light sensor, ambient sensor, temperature sensor, humidity sensor, gas sensor, smoke sensor and air quality sensors.

According to an embodiment herein, the plurality of electronic equipments comprises fans, lighting units, exhaust fans, ventilation fans, air-conditioning equipments, humidifiers, air cleaning equipments and room heaters.

According to an embodiment herein, the environmental space is selected from a group consisting of an office—area, cubicle, living area, wash room, residential area, and industrial factory.

According to an embodiment herein, the time period program is selected and executed based on a type of electronic equipment, a place of installation.

According to an embodiment herein, the different type of electronic equipments in a same environmental space is operated with same time period programs.

According to an embodiment herein, the different type of electronic equipments in a same environmental space is operated with mutually different time period programs.

FIG. 1 illustrates a block diagram of an energy management system, according to an embodiment herein. The system 100 comprises a plurality of electronic equipments installed in the standalone environmental space, a plurality of sensors 101 in communication with a controller unit and a power supply 102. The plurality of sensors 101 is configured for detecting a plurality of environmental conditions/parameters of the standalone environmental space. The plurality of sensors 101 is connected to the controller unit using a wired or wireless connection. The controller unit receives the plurality of environmental conditions/parameters from the plurality of sensors. The controller unit is further configured to control the various operations of the plurality of electronic equipments depending on the inputs from the plurality of sensors. The power supply 102 provides power to the plurality of electronic equipments and to the controller unit. The plurality of sensors 101 comprises different types of sensors for sensing various environmental conditions of the standalone space. The different types of sensors are motion sensors, light sensors, temperature sensors, air quality sensors and the like. The type of sensors installed with individual electronic equipment depends on application area, type of environmental space, the electronic equipments, the environmental conditions and the like. The sensors 101 are activated at different time periods so as to regulate the various equipments at required time intervals. The different time period settings are customized manually by a user or a default setting is used, depending on the electronic equipments. The different time period settings are customized by the user using a handheld device connected to the system 100.

The controller unit is configured to manage the switching of the electronic equipments according to the sensors and the time period settings associated with the electronic equipments. The controller unit comprises a plurality of relays 103 in communication with the plurality of sensors 101, a microcontroller 104, a voltage regulation module 106 and a plurality of electric connectors 105. The electric connectors 105 are configured to connect the electronic equipments to their respective relays and sensors. The relays 103 connected to the electronic equipments are configured so to enable switching of the equipments according to the sensor inputs. The microcontroller 104 is the heart of the unit and all the sensors 101 and relays 103 are connected to the microcontroller 104 The microcontroller 104 is configured to control the plurality of relays 103 according to the inputs from the plurality of sensors 101 and a preset configuration. The voltage regulation module is configured to energize the control unit and the electronic equipments with necessary power. The plurality of sensors 101 triggers a plurality of signals depending on the environmental conditions and type of sensors. The plurality of signals is processed by the microcontroller 104 to accordingly switch on/off of the associated relays.

The microcontroller 104 comprises a set of Time Period Programs configured to control the plurality of electronic equipments which need to be operated periodically or at a preset period of time. The Time Period Programs (TPPs) are pre-loaded programs executed by the microcontroller 104 to establish a duration and aperiodicity for which the associated relay needs to be switched on/off. The TPPs are associated with each relay at the time of initial programming of the controller unit. The TPPs are associated with the sensors 101 if needed, and thus helps in mapping the rules of the environmental space onto the sensors 101 for greater optimisation. The periodicity and the preset period of time required for switching on/off the electronic equipments is set/configured according to a Real Time Clock. The Time Period Programs are customizable for the individual electronic equipments and for the specific types of environmental spaces. The microcontroller 104 adopts Time Period Program templates for programming the various systems with similar type of environmental spaces. The Time Period Program templates have the same settings for the electric equipments that a connected to the relevant relays 103 in the similar environments.

The system further comprises a Bluetooth connectivity and GPRS module 107 and a Wi-Fi module 108 for providing a wireless control to the system 100 via LAN, Ethernet, Internet or SMS. The module is adopted for remotely monitoring the energy management system especially for constantly running the equipment and places like chillers, ATMs, server rooms etc. The hand held device access the Bluetooth connectivity and GPRS module for sending monitoring, preventive maintenance and fault reporting messages to the system.

The system further comprises a switch which is provided in the controller unit and the user uses the switch to alter the time period of the Time Period Programs by a predetermined percentage. This is done to ensure that the user is able to optimise the energy saving or the user experience, when there is an incorrect mapping of the Time Period Programs. The relays are optionally connected in parallel with a master switch to enable a dual control during any breakdown and/or maintenance.

The system further comprises a manual button to put the device on either high or low power saving mode other than the normal mode of operations. The manual button further enables the user to vary the time period for operating the equipments by a certain percentage.

According to an embodiment herein, the multiple energy management systems are connected with each other through wired or wireless connection via LAN, Ethernet, Internet and the like. When a particular system is triggered, the triggered system is configured to activate other systems in the connected network. The systems are activated according to the preset Programs so that the environmental factors of a part of area or complete area managed.

Figure 2:
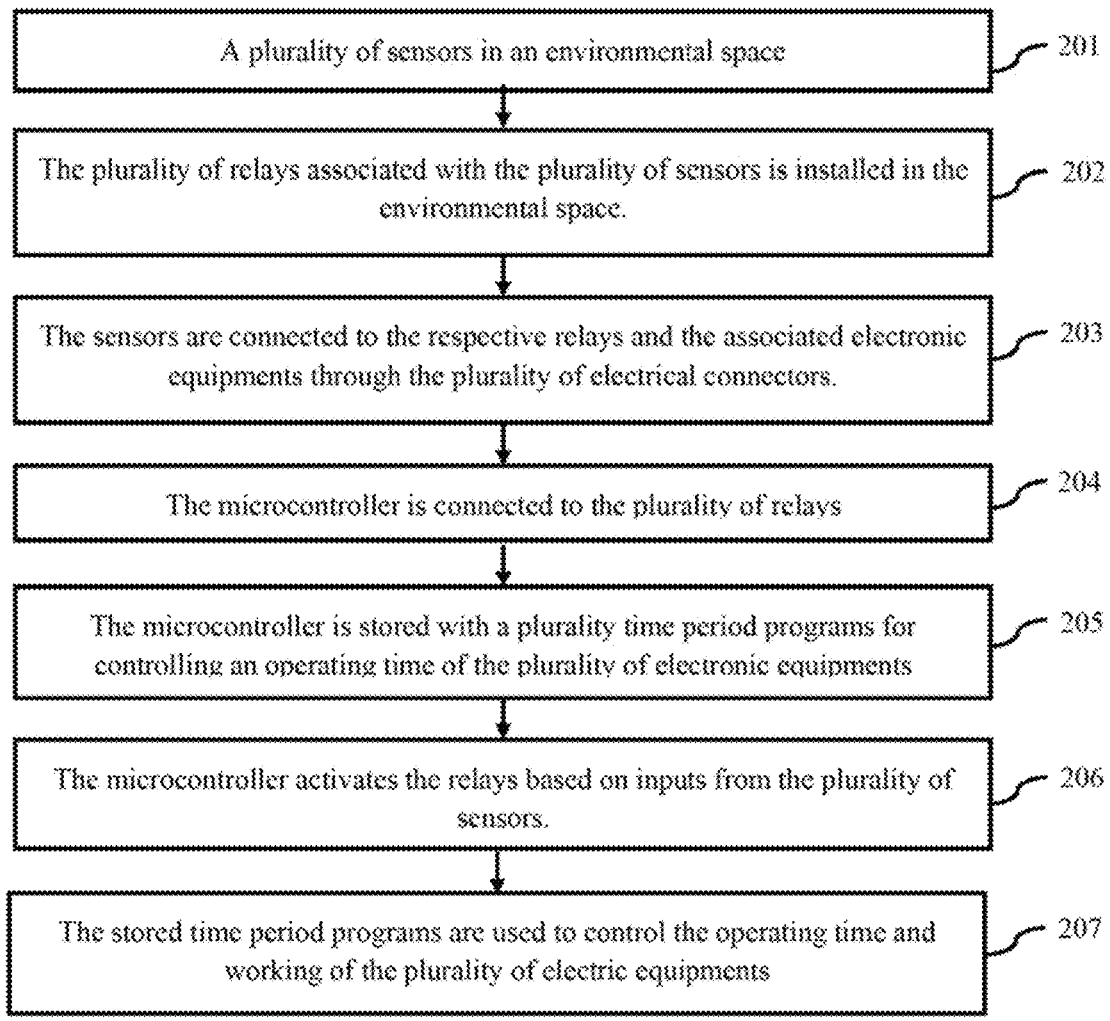
FIG. 2 illustrates a flowchart explaining the process steps involved in a method for managing and controlling: an energy consumption of the plurality of electronic equipments using the controller, according to an embodiment herein.

FIG. 2 illustrates a flowchart indicating the process steps involved in a method for managing and controlling an energy consumption of the plurality of electronic equipments using the controller, according to an embodiment herein. The method comprises a step of installing a plurality of sensors in an environmental space (201). The plurality of relays associated with the plurality of sensors is installed in the environmental space (202). The sensors are connected to the respective relays and the associated electronic equipments through the plurality of electrical connectors (203). The microcontroller is connected to the plurality of relays (204). The microcontroller is stored with a plurality time period programs for controlling an operating time of the plurality of electronic equipments (205). The microcontroller activates the relays based on inputs from the plurality of sensors (206). The stored time period programs are used to control the operating time and working of the plurality of electric equipments, by switching the respective relays connected to the equipments (207).

The method further comprises steps of selecting and initiating an execution of the time period program for the electronic equipment by the controller unit, based on an output from a sensor. The controller unit checks whether any other time period program is already selected and executed for the electronic equipment. The controller unit calculates a residual amount of time remaining in the execution of a previously selected and executed time period program for the electronic equipment, when a time period program is already selected and executed for operating the electronic equipment. Depending on the calculation, the controller unit compares the residual amount of time left during a running of a previously selected and executed time period program and a time value of the newly selected Time Period program. When the time value of the newly selected Time Period program and the calculated residual amount of time left during a running of a previously selected and executed time period program are different, a time value of a newly selected Time Period program is set for operating the electronic equipment based on the newly selected time period program. The electronic equipment is operated for the remaining time period of the previously selected and executed time period program, when the set time value of the newly selected Time Period program is greater than or equal to the residual amount of time left during a running of a previously selected and executed time period program.

According to an embodiment herein, a relay is connected to one or multiple electronic equipments in the given area. The electronic equipments are connected to appropriate relay so as to automate the switching of equipments without changing their default settings. Further, multiple electric equipments are connected to a single relay when the given area has a large number of electric equipments or when the multiple areas have to be managed by a single system. Furthermore, each electric equipment or relay is designated to one or multiple sensors so that only the individual connected electric equipments or relays are switched on, when the designated sensor is triggered. The aforementioned configurations of the system help in saving cost and redundancies during the time of operation. For example, when two or more lights are connected to a single relay, and even when one light is turned off, the other lights are activated to illuminate the given area during the switching on condition of the relay and this is not possible unless one light stops to work. When a particular sensor connected to the associated relay(s) is triggered, the microcontroller switches the associated relay/relays based on the Time Period Program corresponding to the type of sensor. For example, when a motion sensor associated with three relays is triggered, the microcontroller checks for the status of each of the three relays and respectively switches on the relays for a particular time based on their individually associated Time Period Program. When the relay is already switched on, then the Time Period Program under service/running is reset to an initial value. At the end of each Time Period Program, the micro controller switches off the relay and hence turns off the connected electronic device.

When the system is switched on, the power supply unit energises the controller unit and the sensors. When a particular sensor is triggered, the microcontroller switches on the relay connected to the sensor. The power supply needed to energise the connected electronic equipment is passed from the voltage regulation module to the respective equipment through the relay. The switching of the associated electronic equipment is controlled according to the Time Period Program assigned to the designated sensor and relay. For example, when the three different Time Period Programs are set with respect to two sensors and their associated relay, the relay and hence the electric equipment connected to the two sensors executes all three different Time Period Programs. When the sensors are triggered, the two Time Period Programs are assigned respectively to one each of the two sensors. The third Time Period Programs is assigned to the relay, when no activity is detected in the given area. The system ensures inherent flexibility so that different sensors are triggered, when the user moves through the given space, and whereas the relay and the electric equipment associated with sensors perform different Time Period Programs depending on the requirement for the space. Due to the flexibility of the programs for each of the electronic equipment and relays, the system is highly adaptable for different use cases and circumstances.

The relays however can also be controlled without any input from the sensors. In such a case, the controller is programmed to switch on and switch off the relays at preset time intervals or during a preset time of a day so as to ensure a constant environmental or functional factor necessary for the environmental space. The Time Period Programs are a set of instructions loaded on the controller and the programs are assigned to the respective relays. The relays are controlled according to the associating Time Period Program so as to regulate environmental factors by enabling electronic equipments to go on and off during certain time period of the day.

According to an embodiment herein, the handheld device provides options for customizing default settings, sensor settings, time period settings associated to the relays and/or sensors, priority settings and necessary information. The handheld device enables a user to change the system settings. The system settings are downloaded to the handheld device and the changes to the settings are consequently uploaded to the system. The handheld device facilitates the user to input the Master time and other necessary information required for executing the Time Period Programs. The Master time which is input to the system is used to derive the time needed for some of the inbuilt time set programs to function. Further any changes to the default settings of the system are made using the handheld device. The system is also self-configured using an interface on the handheld programmer so as to provide a complete independent programmable solution to the system.

According to an embodiment herein, the changes are made with respect to the sensors and the Time Period Programs that need to be associated to the relays. The Time Period Programs that are associated to the sensors and the priorities for the Time Period Programs are set and saved. The controller unit of the system is pre-programmed at the time of manufacturing for typical standalone spaces like restrooms, conference rooms, cubicles etc. In case of a user customised program, the program is downloaded to the handheld programmer/device and then consequently uploaded to various energy management systems at the press of a button. The handheld device facilitates easier installation of a lame number of energy management systems, in the case of repeatable and similar scenarios. Once the system is installed, the rest of changes to the default setting of the system are carried out using the handheld device.

The energy management system comprises the plurality of sensors for detecting various changes in environmental conditions of the standalone space where the system is installed. The system is connected to various analogue and digital sensors. These sensors include, but not limited to motion sensors, light sensors, temperature sensors, chemical sensors like carbon monoxide sensors, flow sensors, soil moisture sensors, air quality sensors and the like. By receiving various inputs from the sensors, various equipments of the system are controlled. The equipments in turn regulate the conditions which are monitored by the sensors. For example the temperature sensor is used to ensure that the cooling/ventilation systems are turned back into "on" condition, when the temperature exceeds a given value.

An irrigation system is automated by using a soil moisture sensor to switch on water pumps, when the moisture content of the soil goes below a certain value. The automation functionality enables the system to be applied in various applications and not limited to the automation of building equipment and to control the environmental factors therein.

The types of sensors that are presently being connected are Motion Sensors, Ambient Light Sensors, Temperature Sensors, IR sensors and air quality sensors. The Motion Sensors are used to detect the presence of the users in the given space. The Ambient Light Sensor is used to determine the intensity of sunlight in the given space to switch on/off a plurality of lights. The Temperature Sensor is used to read an ambient temperature of the given space to switch on/off a plurality of ACs. The IR Sensor is used to enable communication between the remote and the controller unit to allow the users to set the lighting preferences. The IR Sensor is mostly used for the Conference Room Model. The sensors are typically placed depending on the sensor types. The Motion Sensors are usually placed at the entrance and exit of the given space. The motion sensors are also placed in a way so as to ensure the entire area of the given space is covered by the sensors. The Ambient Light Sensor is placed typically towards a window to determine a true value of the sunlight unadulterated by any incident light from the lighting devices. The Temperature Sensors are placed away from the ACs to get a real value of the temperature in the given space. The IR Sensor is placed in a way that the sensor is accessible to all the inhabitants of the given space with the remote.

The different types of sensors (i.e. the IR sensor, Ambient Light Sensor or Temperature sensor) control the associated relays in following manner, when the respective sensors are triggered.

When the IR sensor is triggered, a value of a remote control key corresponding to the IR sensor is checked by the microcontroller. The IR sensors are preferably used only for remotely controlling the automation of Conference Room. After ascertaining the remote control key, the microcontroller checks the status of the associated relay. When the relay is in a switched on condition, the controller switches off the relay and vice versa. The remote controller also has a reset key which is asserted when the relays are to be switched on from off state and vice versa. Note that the remote keys control only the relays that are designated to operate the lights, at the time of installation.

With the Ambient Light Sensor, the sensor values are monitored by the micro controller. During installation, a plurality of values for the ambient light intensities required for switching each individual relay and hence the corresponding light lifting are determined and stored as preset values in the memory. The microcontroller constantly compares the ambient light intensity value from the Ambient Light Sensor with the stored values for switching on and switching off the associated relays. When the ambient light value matches the preset values, the relay is switched according to the designation of the respective stored values. The light values are measured as a percentage of intensity from 0 to 100%.

The Temperature Sensor works similar to the Ambient Light Sensor and they both utilise the ambient environment to conserve energy. During installation, a plurality of temperature ranges are stored as preset values. The stored values are constantly compared to the ambient temperature of the Temperature Sensor and the relay is switched according to the designation of the respective stored values. The temperature is measured in Celsius.

The ambient light sensors interconnected to the relays through the microcontroller are used to control the light levels when there is ambient light. The multiple ambient light sensors are deployed over the given space and the light fixture is controlled by one or more ambient light sensors. One or more of the ambient light sensors are pre-programmed with the range of lighting values to switch on or off one or more relays. With the aforementioned arrangement, the light flux/intensity levels for the given space are finely controlled by optimising the usage of the ambient light. In a similar way, the temperature of the given space is regulated by deploying multiple temperature sensors in the given space and the air conditioning units are controlled through the relays based on the output from one or more of the temperature sensors. Both the lights and the air conditioning units are controlled with greater efficiency, when coupled with dimmable light ballast and a variable fan motor which are controlled by the relay using variable voltage.

According to an embodiment herein, the Time Period Programs are pre-programmed algorithms associated with each relay at the time of the initial programming of the energy management system. The Time Period Programs are preloaded software algorithms executed by the microcontroller to establish the duration and periodicity for which the associated relay has to be switched on/off. The Time Period Programs define a time period for switching of the associated relays, where the time period is derived from a Master Time Program. The Master Time Program is set at the time of installation and is configured to derive time intervals and preset timings for operating the relays. The timings are configured according to a particular time of day, hours, minutes or seconds. The Time Period Programs are custom made for individual equipment or devices and for specific types of spaces. The Time Period Programs are built for typical electronic equipments like lights, exhaust systems, split air conditioners, air cooling blowers, humidifiers, air cleaning equipments and the like. The Time Period Programs ensure that the operation of the particular equipment is executed in an optimized but also effective manner. There are also non equipment specific Time Period Programs available if any equipment is needed to be operated periodically or at preset times of the day.

The Master Time Program also known as primary time program is a time period program from which a plurality of subordinate Time Period Programs is derived. Instead of specifying different units of time for each Time Period Programs during installation, the subordinate time programs are programmed to be preset multiples of the Master Time Program. For example, a Secondary Time Period program is a second derivative of the Master Time and the Tertiary Time Program is a third derivative of the Master Time. The Time Period Programs are used to ensure that the equipments in the given space do not shut down simultaneously and instead switch off gradually in phases with multiple levels of operation. The main objective of subordinate Time Period Programs is to save time and duplication during installation which translates into greater efficiencies. The Cyclic Time period program and the Air Conditioning Time period program are a preset multiple of the Master Time period program which ensures that there is synchronization between the TPPs for the lights and the TPPs for the ventilation systems and Air Conditioners. The TPPs are further categorised into fixed time period programs and custom time period programs, which are a derivate of the Main time period. The fixed time period program and the custom time period program can be set to any length of time. The fixed time period program and the custom time period program are used when a time period other than the multiples of primary time is needed to be used at installation of the system.

The Primary Time Period Programs and Secondary Time Period Programs are primarily used to control lighting. The lighting for any given area is divided into Primary Time lights and Secondary Time lights. The Primary Time lights are the lights that are switched off after elapsing of the Primary time which is derived from the Master Time. The Secondary Time lights are the lights that are switched off after the Secondary Time which is always greater than and is a multiple of the Primary Time by a built-in-factor. The delayed switching off of the lights is adopted to intimate the user of the given space outside of the sensor's coverage area before shutting down the lighting system. During the delay time, the available luminance of the area enables the user to navigate and exit the area or to trigger the sensor again. Further an option is provided at the system to dim the lights. This option is applicable when the present lights are replaced with the dimmable type. The lights are also controlled using the light sensor to check for ambient light so that there is further energy savings and the user experience is uniform. The lights that need to be associated with the ambient light sensors are connected at the time of installation, The Cyclic Time Period Programs are used to control exhaust systems and fans. In areas like restrooms, there needs to be a constant circulation of fresh air which would otherwise lead to an unpleasant user experience. When the exhaust systems are idle, the cyclic time program is configured such that the relays switch the exhaust systems between on and off state at intervals for a time period based on the Master time set during installation. The cyclic time ensures that even when the associated sensor is not triggered, the exhaust systems are switched on after 4× time period, after which the exhaust system is switched off for a further period of 8× time. After the switch off time period, the exhaust system is again switched on for 4× the primary time. Hence the time interval increases between subsequent runs of the exhaust system, thus saving energy as well as maintaining fresh air in the given space. The intervals between switching are reduced progressively when there is no user activity so as to ensure further energy savings.

The Air Conditioning Time Period Programs are meant to control an air conditioning system in conjunction with the user activity. The ambient temperature is monitored when there is no user activity. During installation, an optimum temperature and a temperature range (in Celsius) is set, according to which the air conditioner/s are controlled. The optimum temperature is the temperature at which the given space needs to be maintained during user occupancy. The temperature range is the range of optimum temperatures at which the given space is needed to be maintained during the time periods when the area is unoccupied. When the given space is occupied, the air conditioners are switched on to optimise the user experience. When the space is unoccupied, the air conditioners are switched on periodically to circulate fresh air. When the ambient temperature exceeds preset limits, the Air Conditioners (ACs) are switched on until the next preset limits are reached. In other words, the AC's are only switched on when the motion sensors are triggered and the ambient temperature is within a specified range. When the specified range is exceeded, the ACs are switched on even if the given space is unoccupied. This action ensures a satisfactory experience when a user walks into the given space. Thus the user experience is optimized and satisfactory.

To have a better understanding of the embodiments herein, the energy management system is illustrated using an example of two adjacent Restrooms (say gents and ladies). The energy management system has four lights and two exhaust fans installed at each restroom. The system further comprises two sensors, one for each room and a device to control both the bathrooms. Further a motion sensor is placed for a recess area or common passage which leads to the Men and Ladies. The motion sensor activates one or two lights each in the Men and Ladies restroom for only 10 seconds which enables the user to have some lighting during the night. The lighting is on till the next motion sensor is triggered inside either the Men or Ladies restroom. In each bathroom, two lights are designated with primary time and the other two lights are designated as secondary time. The exhaust fans would be designated as cyclic time.

When the motion sensor is triggered inside the restroom, all the 4 lights and 2 exhaust fans of that restroom are triggered to 'ON'state. After a set delay, only primary lights are switched off The secondary lights are turned off after a further set delay and then subsequently the fans are turned off after another set delay. The light sensors are placed in each restroom to ascertain the level of ambient light so that the lights are only switched on below a certain level of ambient light. Also even if no presence is detected, the fans will be switched on and off at increasing intervals to ensure that there is fresh air. With just a single energy management system, multiple bathrooms are controlled. In the case of two bathrooms with two motion sensors, the switches from each bathroom are designated to the respective motion sensor so that only those lights and fans of a particular restroom are on when the respective sensor is triggered. Thus a multiple zones can be individually controlled.

Figure 3:
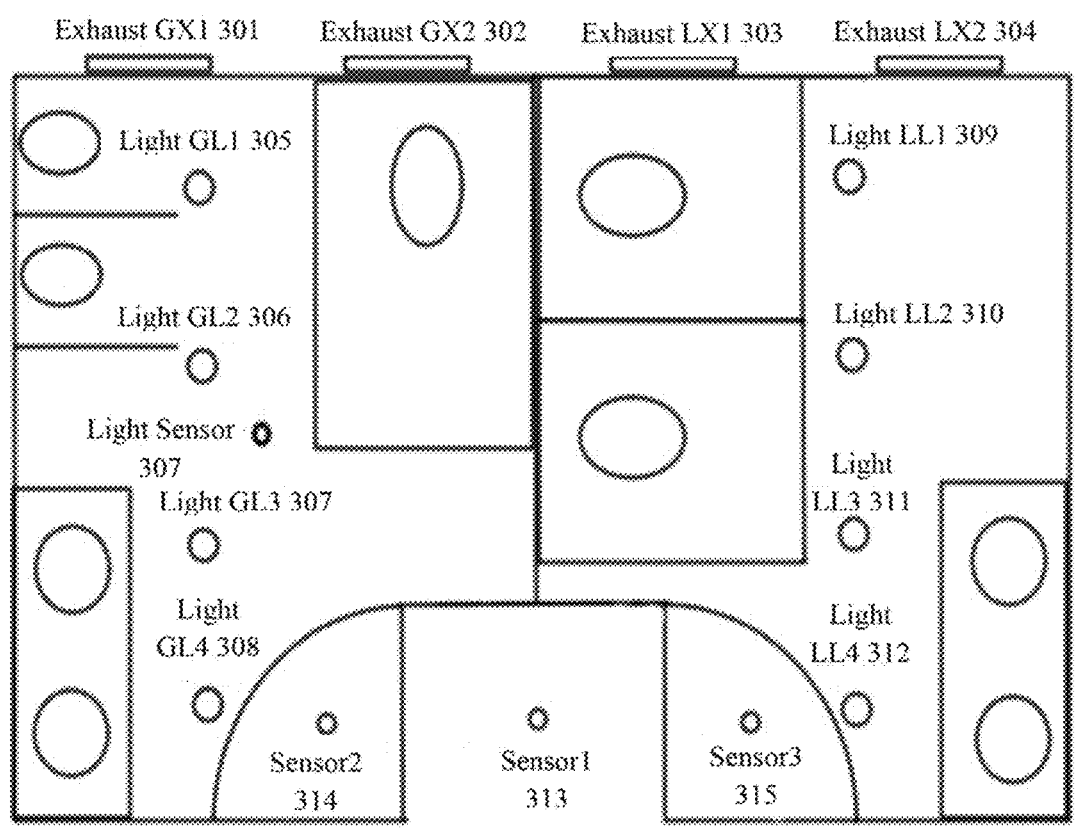
FIG. 3 illustrates a schematic diagram an energy management system installed in a Restroom space, indicating the arrangement of various electronic equipments installed in the Restroom, according to an embodiment herein.

FIG. 3 illustrates a physical layout of a Restroom space for displaying the arrangement of various electronic equipments installed in the Restroom, according to an embodiment herein. As per the example, the lights and exhaust fans are connected to twelve separate relays else six separate relays are used by joining the lights and fans together by their respective Time Period Program. Hence in the Gents restroom, the lights GL1 305 and GL4 308 are connected together and used as primary lights, GL2 306 and GL3 307 are connected and used as secondary lights, GX1 301 and GX2 302 are connected and used as cyclic time fans. The same configuration is repeated for the Ladies restroom. The Sensor 313 is installed in the corridor or passage of the restroom, whereas Sensor2 314 and Sensor3 315 are placed in Gents section and Ladies section of the restroom. The primary time lights in the Gents restroom and Ladies restroom are switched on for 10 seconds when Sensor1 313 is triggered. This is because both the lights are connected to the same relay. The relay is configured to switch only one light when Sensor1 313 is triggered. Here six relays have been considered as an example. The designation for each relay is as follows:

| Relay 1 (R1) | Lights GL1 305 and GL4 308 |
| Relay 2 (R2) | Lights GL2 306 and GL3 307 |
| Relay 3 (R3) | Exhaust Fans GX1 301 and GX2 302 |
| Relay 4 (R4) | Lights LL1 309 and LL4 312 |
| Relay 5 (R5) | Lights LL2 310 and LL3 311 |
| Relay 6 (R6) | Exhaust Fans LX1 303 and LX2 304 |

During installation, each relay and hence the connected Device is associated with the relevant sensor. The table below illustrates connection between the relays, sensors and the electronic equipments.

| Sensor1 313 | Relay 1 and Relay 4 | Primary Lights Gents and Primary Lights Ladies |
| Sensor2 314 | Relay 1, Relay 2 and Relay 3 | Primary Lights, Secondary Lights and Exhaust Fans of Gents |
| Sensor 3 315 | Relay 4, Relay 5 and Relay 6 | Primary Lights, Secondary Lights and Exhaust Fans of Ladies |

Figure 4:
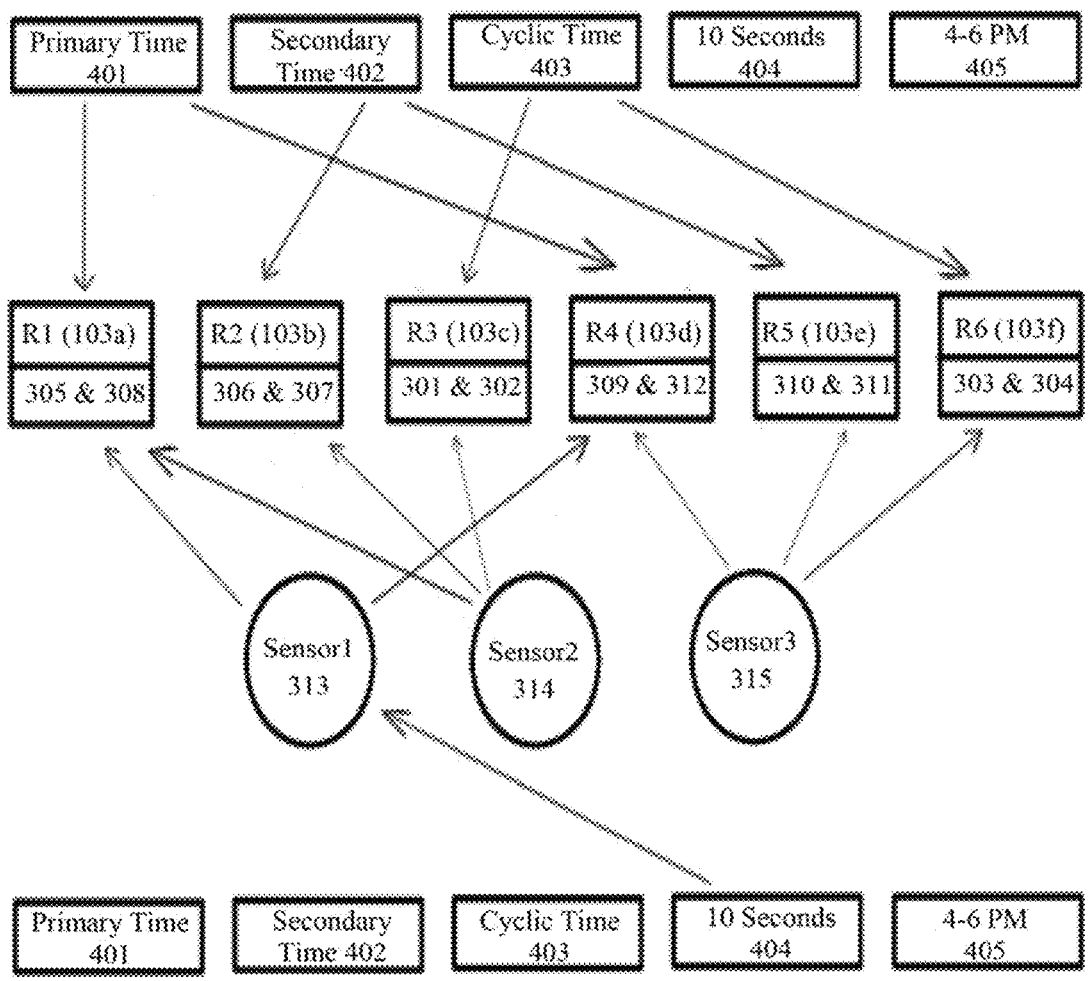
FIG. 4 illustrates a communication flow-diagram indicating the communication between various units of the energy management system, according to an embodiment herein.

FIG. 4 is a flow-diagram illustrating the communication between various units of the energy management system installed at the Restroom, according to an embodiment herein. Each Relay and Sensor are programmed with the respective Time Period Program, The Master Time is inputted and the relays are configured are Lighting or Exhaust fans. Further the Lighting Relays are configured as Primary or Secondary Relays. With respect to FIG. 4, the table below lists the connection between the sensors, the relays and the associated electronic equipments.

| Relay | | Sensor | |
|---|---|---|---|
| Relay 1R1(103a) | Primary Time401 | Sensor1 313, Sensor2 314 | Lights GL1 305 and GL4 308 |
| Relay 2 R2(103b) | Secondary Time 402 | Sensor2 314 | Lights GL2 306 and GL3 307 |
| Relay 3 R3(103c) | Cyclic Time 403 | Sensor2 314 | Exhaust Fans GX1 301 and GX2 302 |
| Relay 4 R4(103d) | Primary Time 401 | Sensor1 313, Sensor 3 315 | Lights LL1 309 and LL4 312 |
| Relay 5 R5(103e) | Secondary Time 402 | Sensor 3 315 | Lights LL2 310 and LL3 311 |
| Relay 6 R6(103f) | Cyclic Time 403 | Sensor 3 315 | Exhaust Fans LX1 303 and LX2 304 |

The time period for activation of different sensors is as given below

Sensor 1-10 Seconds 404

Sensor 2-nil

Sensor 3-nil

Relay 1 (R1) and Relay 4 (R4) have multiple sensors providing input. to ensure that there is no conflict, when one of the sensors is triggered, the controller will first check if the Relay is currently active. If the Relay is active then the controller will check if the time left for the Time Period Program currently active is greater or lesser in value to the Time Period Program of the last trigger and accordingly replace the greater Time Period Program. This ensures seamless management even if the sensors are continuously triggered.

Working

If motion sensor 1 is triggered
If Ambient Light is less than stored value
Then switch on Lights GL1, GL4, LL1 and LL4 for 10 seconds
If motion sensor 2 gents is triggered
If Ambient Light is less than stored value
Then switch on lights GL1, GL2, GL3, GL4 and Exhausts GX1 and GX2
If time since last trigger equals primary time
Switch off primary lights GL1, GL4
If time since last trigger equals secondary time
Switch off secondary lights GL2, GL3
If time since last trigger equals cyclic time
Switch off Exhausts GX1 and GX2
If time since last trigger equals cyclic time+n
Switch on Exhausts GX1 and GX2 for cyclic time
If time since last trigger equals cyclic time+(n+n)
Switch on Exhausts GX1 and GX2 for cyclic time ATM's are another type of typical standalone space where there is a constant and Inefficient usage of electricity. There is always excess lighting during the day and also the Air Conditioning is always on to keep the temperature stable irrespective of the occupancy of the given space. Here an ATM with 4 lights, signage lights and two split Air Conditioners have been considered.

The four lights and the signage lights are connected to 4 relays and the 2 AC's are connected to the other 2 relays. Since there is only one motion sensor, all the designated Relays will be triggered by the single sensor. The system also comprises a light sensor to check for the ambient light and a temperature sensor to monitor the temperature inside the ATM.

| Relay 1 | Primary Time | Light L1 Sensor |
| Relay 2 | Primary Time | Light L3 Sensor |
| Relay 3 | Ambient Light Time | Light L2 and L4 |
| Relay 4 | Ambient Light Time | Signage Lights |
| Relay 5 | Air Conditioner Time | AC1 Sensor |
| Relay 6 | Air Conditioner Time | AC2 Sensor |

When the motion sensor is triggered, only the lights on Primary Time and the ACs are switched on. The lights L1 and L3 on the Primary Time Period Program are switched on when the motion sensor is triggered provided there is insufficient ambient light. The lights L2 and L4 are controlled by the Ambient Light Time Period Program and are turned off if the ambient light levels are above the set limit. The Ambient Light Time Period Program is designated specifically to each relay and depends on the level of ambient light that is set for the particular relay. When the ambient light falls below the set value, the associated relay is turned on. The program further determines the light levels from the Light Sensor and accordingly ensures that the Signage Lights are switched on at dusk and are switched off during dawn. Also the lights L2 and L4 remain on when there is insufficient ambient light irrespective of user activity and irrespective of whether its day or night. This will ensure the proper functionality of the ATM.

The ACs are controlled using the Air Conditioning Time Period Program which ensures that the temperature inside the ATM does not exceed a specified temperature range at all times. At the time of installation, two sets of temperature ranges are set, one temperature range is used when there is no user activity and another temperature range is used when there is a user activity. The ACs are switched on when the motion sensor is triggered provided the temperature is outside the user activity range. The ACs are also turned on if the temperature exceeds the specified range even when there is no user activity. The Air Conditioning Time Period Program ensures that the user experience is not unpleasant. The Program also ensures that during extended periods of user inactivity and when the set temperature range is not exceeded, the ACs are switched on for brief intervals so as to ensure proper ventilation of fresh air.

Figure 5:
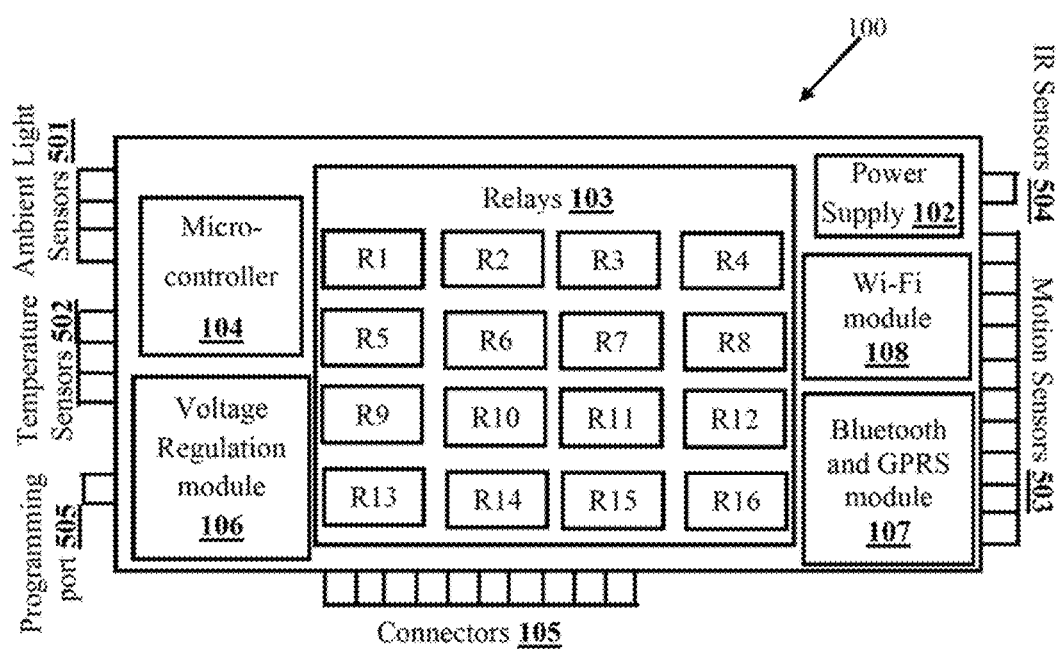
FIG. 5 illustrates a block diagram of the energy management system according to an embodiment herein.

To further illustrate the working of the energy management system, another example of the energy management system installed at a restroom is provided, FIG. 5 illustrates a block diagram of the energy management system 100 installed at the restroom, according to an embodiment herein. The system 100 comprises a plurality of ambient light sensors 501, a plurality of temperature sensors 502, a plurality of motion sensors 503 and an infrared sensor 504 for detecting various environmental changes in the restroom. The system is energised by the power supply 102. The amount of power required to energise the equipments is controlled by the voltage regulation module 106. The energy management system 100 further comprises 16 relays (R1-R16)103 in communication with microcontroller 104, to control the electronic equipments of the restroom. The relays 103 are connected to the equipments through the connectors 105. The microcontroller 104 is programmed with different time period programs which are used to operate to the equipments accordingly by switching the relays 103 connected to the microcontroller 104. A programming port 505 is adopted to transfer the time period programs to the microcontroller 104. The Wi-Fi module 108 and the Bluetooth and GPRS module 107 provides communication between the system and the handheld device.

Figure 6:
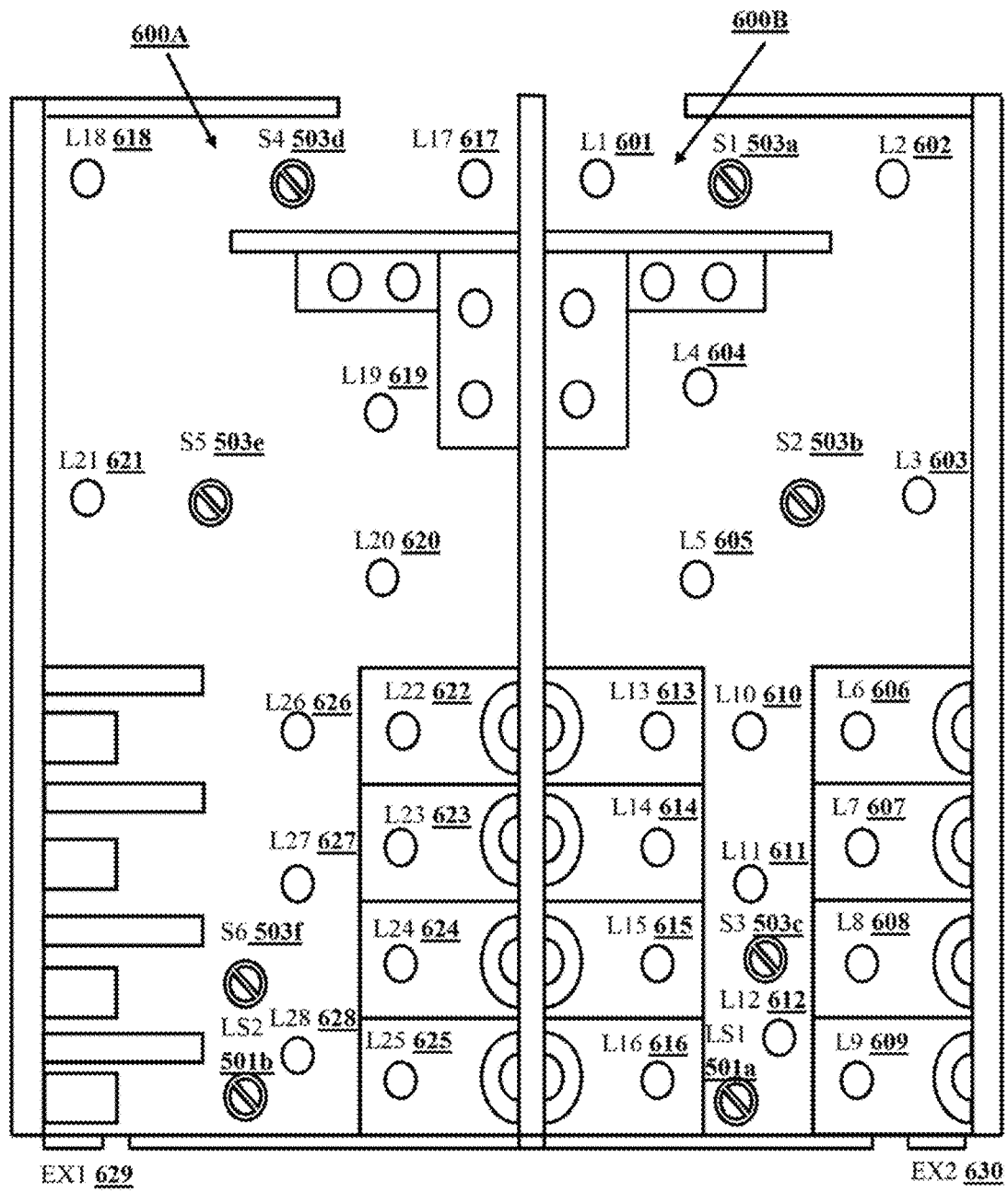
FIG. 6 illustrates a physical layout of the Restroom space comprising an arrangement of various lighting equipments and exhaust systems installed in the Restroom, according to an embodiment herein.

FIG. 6 illustrates a physical layout of the Restroom space comprising an arrangement of various lighting equipments and exhaust systems installed in the Restroom, according to an embodiment herein. The restroom, is divided into two sections 600A and 600B The restroom is installed with a plurality of lighting equipments L1 to L28 (601-628) and exhaust systems EX1 629 and EX2 630. The first set of lighting equipments L1-L16 (601-616) and exhaust system EX1 629 are installed in section 600A, whereas lighting equipments L17-L28 (617-628) and exhaust system EX2 630 are installed in section 600B. The energy management system is used to control the operations of installed equipments. The system adopts all the motion sensors (503a-503f) and two ambient light sensors (501a, 501b) to detect the environmental changes in the restroom and accordingly control the switching of lighting equipments, The system adopts a plurality of relays to control the switching of lighting equipments and exhaust systems according to inputs received from the sensors and the time period programs.

According to an embodiment herein, the exhaust fans and the lighting units in a rest room are operated with mutually different time period programs based on the output of motion sensors.

FIG. 7 illustrates a table listing the connection between the sensors, the relays and the associated electronic equipments installed at the Restroom, according to an embodiment herein. The lighting equipments are segregated into primary lights and secondary lights. The primary time period programs and the secondary time period programs are adopted to operate the relays connected to the primary lights and secondary lights respectively. The exhaust systems are operated according to a cyclic time period program.

According to an embodiment herein, multiple systems are connected with each other through Ethernet or wirelessly. When one system is triggered, the triggered system activates all other systems according to the preset Programs so that their environmental factors in a part of an area or the entire or complete areas or buildings are managed/controlled.

According to one embodiment herein, the algorithm and method of interconnecting the motion sensors to the relays is also be used to control the light levels accurately when there is ambient light. Multiple ambient light sensors are deployed over a given space. As a result, each relay and hence the light fixtures are controlled by one or more of the ambient light sensors. With this arrangement, light flux/intensity levels for a given space are finely controlled by optimising the usage of the ambient light. In a similar way, the temperature of a given space is also be regulated by deploying multiple temperature sensors in the given space and the air conditioning units are controlled through the relays by one or more of the temperature sensors. Both the lights and the air conditioning are controlled with greater efficiency when coupled with dimmable light ballast and a variable fan motor which are controlled by the relay using variable voltage.

According to one embodiment herein, the system is also self configured using an interface or handheld programmer so that the system is also treated as independent and as a completely programmable stand alone system.

The foregoing, description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the embodiments herein are described with various specific embodiments, it will be obvious for a person skilled in the art to practice the invention with modifications. However, all such modifications are deemed to be within the scope of the claims.

It is also to be understood that the following claims are intended to cover all of the generic and specific features of the embodiments described herein and all the statements of the scope of the embodiments which as a matter of language might be said to fall there between.

What is claimed is:

1. An energy management system comprising:
   a plurality of electronic equipments installed in an environmental space or habitat, and wherein the plurality of electronic equipments comprises fans, lightening units, exhaust fans, ventilation fans, air-conditioning equipments, humidifiers, air cleaning equipments and room heaters;
   a plurality of sensors configured for sensing a plurality of environmental conditions or parameters of the environmental space, and wherein the plurality of sensors includes one or more sensors selected from a group consisting of motion sensor, proximity sensor, light sensor, ambient sensor, temperature sensor, humidity sensor, gas sensor, smoke sensor and air quality sensors;
   a plurality of relays for controlling the plurality of electronic equipments, wherein the plurality of relays is in connection with the plurality of sensors, wherein the plurality of relays is configured for switching the electronic equipments depending on the sensor inputs;
   a controller unit configured for controlling operations of the plurality of electronic equipments through the plurality of relays based on inputs from the plurality of sensors, and wherein the controller unit comprises a microcontroller to execute a set of Time period Programs that are configured to operate the plurality of electronic equipments at periodical intervals or at a preset period of time, wherein the Time Period programs are configured to establish a duration and periodicity to switch on/off the associated relay, wherein the periodicity and the preset period of time is configured according to a Real Time Clock; and
   a power supply unit configured for providing power to the plurality of electronic equipments;
   a hand held device comprising a programmable interface configured to provide options for customizing default settings, sensor settings, time period settings/programs associated to the relays and/or sensors, priority settings and necessary information, wherein the programmable interface is configured to enables a user to change the system settings and wherein the programmable interface enables to self-configure the system;
   wherein the plurality of sensors are connected to the controller unit using a wired or wireless connection;
   wherein the type of sensors installed depend on an application area, type of environmental space, the electronic equipments and the environmental conditions concerning the plurality of sensors;
   wherein the plurality of sensors are activated at a predetermined set of time periods, wherein the predetermined set of time periods are customized manually and/or using a default setting based on the type of the electronic equipments, wherein the predetermined set of time periods are customized by a handheld device connected to the system;
   wherein the controller unit activates either one or more relays based on output from one or more sensors to control operation and operating time of the plurality of electronic equipments, and wherein the set of time period program comprises a Master time period program, a plurality of subordinate time period programs and a customized time period program and wherein the plurality of subordinate Time Period Programs are derived from the master time period program, wherein the plurality of subordinate Time Period Programs are preset multiples of the Master Time Program, wherein the customized time period program is set based on inputs from user, and wherein the customized Time Period Programs are customized for the individual electronic equipments and for the specific types of environmental spaces, and wherein the microcontroller adopts Time Period Program templates for the similar type of environmental spaces, and wherein the Time Period Program templates have the same settings for the electronic equipments that are connected to the relevant relays in the similar environments, and wherein the time period program is selected and executed based on a type of electronic equipment, a place of installation, and wherein the different type of electronic equipments in a same environmental space are operated with same time period programs or mutually different time period programs.

2. The system according to claim 1, wherein the controller unit comprises:
a microcontroller configured for managing the plurality of relays according to a preset configuration and the inputs from the plurality of sensors;
a voltage regulation unit configured for energizing the controller unit;
a plurality of connectors configured for connecting the plurality of relays to the respective electronic equipments;
wherein one or more electronic equipments are connected to a particular relay, wherein one or more relays are controlled by one or more sensors so as to switch only a particular electronic equipment connecter to the respective relays, wherein a single relay is activated based on output from one or more sensors and wherein a plurality of relays are activated based on output from one or more sensors.

3. The system according to claim 1, wherein the plurality of sensors triggers a plurality of signals according to the type of sensors, wherein the plurality of signals are processed by the microcontroller to switch on/off of the associated relays.

4. The system according to claim 1, wherein the microcontroller switches on a particular relay on receiving an input from the associated sensor connected to the particular relay, wherein the power supply needed to energize the electronic equipment connected to the relay is passed from the voltage regulation unit.

5. The system according to claim 1, wherein the plurality of relays are controlled without any input from the sensors, wherein the controller unit is programmed to switch on/off the plurality of relays at particular time intervals and during a preset time of the day to ensure a constant environmental or functional factor necessary for the environmental space.

6. The system according to claim 1, wherein the handheld device is configured to provide options for customizing default settings, sensor settings, time period settings associated to the relays and/or sensors, priority settings and necessary information, wherein the hand-held device enables a user to change the system settings.

7. The system according to claim 1, wherein the controller unit is provided with a switch to alter the time period of the Time Period Programs by a predetermined percentage, wherein the relays are optionally connected in parallel with a master switch to enable dual control during any breakdown and/or maintenance.

8. The system according to claim 1, further comprises a Bluetooth communication unit and GPRS unit for providing wireless communication to the system via Ethernet, Internet or SMS.

9. The system as claimed in claim 1, further comprises a manual button to change an operating mode of the device to either high power saving mode or low power saving mode, and wherein the operating modes of the device includes a normal mode of operations, a high power saving mode and a low power saving mode.

10. The system according to claim 1, wherein the environmental space is elected from a group consisting of an office area, cubicle living area, washroom, residential area, industrial factory.

11. A method for managing and controlling an energy consumption of a plurality of electronic equipments using a controller, the method comprising steps of:
installing a plurality of sensors in an environmental space, and wherein the plurality of sensors includes one or more sensors selected from a group consisting of motion sensor, proximity sensor, light sensor, ambient sensor, temperature sensor, humidity sensor, gas sensor, smoke sensor and air quality sensors;
installing a plurality of relays in the environmental space;
communicatively connecting the plurality of sensors and plurality of relays;
connecting the plurality of relays with a plurality of electronic equipments installed in the environmental space, and wherein the plurality of electronic equipments comprises fans, lighting units, exhaust fans, ventilation fans, air-conditioning equipments, humidifiers, air cleaning equipments and room heaters;
connecting a microcontroller to the plurality of relays;
selecting and initiating an execution of a time period program for an electronic equipment by the controller, based on an output from a sensor;
checking whether any other time period program is already selected and executed for the electronic equipment;
calculating a residual amount of time remaining in the execution of a previously selected and executed time period program for the electronic equipment, when a time period program is already selected and executed for operating the electronic equipment;
comparing the calculated residual amount of time left during a running of a previously selected and executed time period program and a time value of the newly selected Time Period program; and
setting a time value of a newly selected Time Period program for operating the electronic equipment based on the newly selected time period program, when the time value of the newly selected Time Period program and the calculated residual amount of time left during a running of a previously selected and executed time period program are different; and
operating the electronic equipment for the remaining time period of the previously selected and executed time period program, when the set time value of the newly selected Time period program is greater than or equal to the residual amount of time left during a running of a previously selected and executed time period program;
wherein the microcontroller stored with a plurality time period programs for controlling an operating time of the plurality of electronic equipments;
wherein the microcontroller activates a plurality of relays based on inputs from the plurality of relays and the stored time period programs to control the operating time and working of the plurality of electric equipments, and wherein the microcontroller is configured to run a set of Time Period Programs that are configured to operate the plurality of electronic equipments at periodical intervals or at a preset period of time, wherein the Time Period Programs are configured to establish a duration and periodicity to switch on/off the associated relay, wherein the periodicity and the preset period of time is configured according to a Real Time Clock or by the triggering of sensors;
wherein one or more electronic equipments are connected to a particular relay, wherein one or more relays are controlled by one or more sensors so as to switch only a particular electronic equipment connected to the respective relays, wherein a single relay is activated based on output from one or more sensors and wherein a plurality of relays are activated based on output from one or more sensors and wherein a plurality of relays are activated based on output from one or more sensors, and wherein the set of time period program comprises a Master time period program, a plurality of subordinate time period programs and a customized time period program and wherein the plurality of subordinate Time Period Programs are derived from the master time period program, wherein the plurality of subordinate Time Period Programs are preset multiples of the Master Time Program, wherein the customized time period program is set based on inputs from user, and wherein the customized Time Period Programs are customizable for the individual electronic equipments and for the specific types of environmental spaces, and wherein the time period program is selected and executed based on a type of electronic equipment, a place if installation, and wherein the different type of electronic equipments in a same environmental space are opened with same time period programs or mutually different time period programs.

12. The method as claimed in claim 11, wherein the plurality of time period programs is assigned with a priority by the controller during installation of the system.

13. The method as claimed in claim 11, a particular relay and the associated electronic equipments are activated by one or more sensors, wherein the associated electronic equipments are controlled according to the assigned Time Period Program, when the designed sensor is triggered.

14. The method according to claim 11, wherein the plurality of sensors triggers a plurality of signals according to the type of sensors, wherein the plurality of signals is processed by the microcontroller to switch on/off of the associated relays.

15. The method according to claim 11, wherein the microcontroller switches on a particular relay on receiving an input from the associated sensor connected to the particular relay, wherein the power supply needed to energize the electronic equipment connected to the relay is passed from a voltage regulation unit.

16. The method according to claim 11, wherein the plurality of relays are controlled without any input from the sensors, wherein the controller is programmed to switch on/off the plurality of relays at particular time intervals and during a preset time of the day to ensure a constant environmental or functional factor necessary for the environmental space.

17. The method according to claim 11, wherein the environmental space is selected from a group consisting of au office-area, cubicle, living area, washroom, residential area, industrial factory.

* * * * *